US010003972B2

(12) United States Patent
Pinheiro et al.

(10) Patent No.: US 10,003,972 B2
(45) Date of Patent: Jun. 19, 2018

(54) SYSTEMS, METHODS, AND DEVICES FOR APPLICATION AWARE ACCESS CONTROL FOR COMMUNICATION ON A MOBILE NETWORK

(71) Applicant: Intel IP Corporation, Santa Clara, CA (US)

(72) Inventors: Ana Lucia A. Pinheiro, Breinigsville, PA (US); Marta Martinez Tarradell, Hillsboro, OR (US); Sangeetha L. Bangolae, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 58 days.

(21) Appl. No.: 14/494,169

(22) Filed: Sep. 23, 2014

(65) Prior Publication Data

US 2015/0195712 A1     Jul. 9, 2015

Related U.S. Application Data

(60) Provisional application No. 61/924,194, filed on Jan. 6, 2014.

(51) Int. Cl.
*H04W 12/08*     (2009.01)
*H04W 28/02*     (2009.01)
(Continued)

(52) U.S. Cl.
CPC ....... *H04W 12/08* (2013.01); *H04W 28/0289* (2013.01); *H04W 48/02* (2013.01);
(Continued)

(58) Field of Classification Search
CPC . H04W 48/02; H04W 28/0289; H04W 12/08; H04W 28/06; H04W 48/08;
(Continued)

(56) References Cited

U.S. PATENT DOCUMENTS

2008/0014912 A1    1/2008  Otaka et al.
2011/0310842 A1*   12/2011 Eisl .................. H04W 36/0072
                                                            370/331
(Continued)

FOREIGN PATENT DOCUMENTS

EP    2487962 A1    8/2012
EP    2849495 A1    3/2015
(Continued)

OTHER PUBLICATIONS

International Search Report and the Written Opinion received for PCT/US2015/010360, dated Mar. 30, 2015, 10 pp.
(Continued)

*Primary Examiner* — George Eng
*Assistant Examiner* — Umair Ahsan
(74) *Attorney, Agent, or Firm* — Stoel Rives LLP

(57) ABSTRACT

A user equipment (UE) is configured to receive, from a network, a first access control message and a second access control message. The first access control message corresponds to a first access control service, and the second access control message corresponds to a second access control service. The first and second access control messages include access control information for controlling access to the network for at least one application on the UE. The UE is also configured to determine a combined access level for the at least one application based on the first and second access control messages and to limit access to wireless communications for the at least one application based on the combined access level.

13 Claims, 7 Drawing Sheets

(51) Int. Cl.
*H04L 29/06* (2006.01)
*H04W 48/02* (2009.01)
*H04W 88/02* (2009.01)
*H04W 48/12* (2009.01)

(52) U.S. Cl.
CPC .......... *H04L 63/105* (2013.01); *H04W 48/12* (2013.01); *H04W 88/02* (2013.01)

(58) Field of Classification Search
CPC ... H04W 76/027; H04W 76/04; H04W 88/02; H04J 2011/0096; H04L 63/105; H04L 65/1006; H04L 65/1016; H04M 7/0066; Y02B 60/50
See application file for complete search history.

(56) References Cited

U.S. PATENT DOCUMENTS

| | | | | |
|---|---|---|---|---|
| 2013/0122906 | A1* | 5/2013 | Klatt | H04W 48/02 455/435.1 |
| 2013/0194998 | A1 | 8/2013 | Susitaival et al. | |
| 2013/0279433 | A1 | 10/2013 | Dinan | |
| 2013/0329673 | A1 | 12/2013 | Kwon et al. | |
| 2014/0370890 | A1* | 12/2014 | Huang | H04W 48/02 455/434 |
| 2015/0049608 | A1* | 2/2015 | Palm | H04W 28/0289 370/230 |
| 2015/0126147 | A1* | 5/2015 | Koskela | H04W 4/22 455/404.1 |
| 2015/0304937 | A1* | 10/2015 | Kim | H04W 48/14 370/230 |
| 2016/0014632 | A1* | 1/2016 | Siow | H04L 5/0085 370/230 |

FOREIGN PATENT DOCUMENTS

| | | |
|---|---|---|
| KR | 1020130018139 | 2/2013 |
| WO | 2013141600 A1 | 9/2013 |
| WO | 2013168700 A1 | 11/2013 |

OTHER PUBLICATIONS

Research in Motion UK Ltd., "Enhancement of SSAC in include requirements for ACDC", S1-131048, 3GPP TSG-SA WG1 Meeting #61, Prague, Czech Republic, Change Request, Current Version 11.2.0, Jan. 28-Feb. 1, 2013, 2 pages.

3GPP TR 22.806, "3rd Generation Partnership Project; Technical Specification Group Services and System Aspects; Study on Application specific Congestion control for Data Communication (Release 13)", V0.4.0, Nov. 2013, 26 pages.

Research in Motion UK Ltd., "Enhancement of SSAC to include requirements for ACDC", S1-131047, 3GPP TSG-SA WG1 #61. Prague, Czech Republic, Agenda Item 5.2, Jan. 28-Feb. 1, 2013, 2 pages.

* cited by examiner

SYSTEMS, METHODS, AND DEVICES FOR APPLICATION AWARE ACCESS CONTROL FOR COMMUNICATION ON A MOBILE NETWORK

RELATED APPLICATION

This application claims the benefit under 35 U.S.C. § 119(e) of U.S. Provisional Application No. 61/924,194, filed Jan. 6, 2014, which is hereby incorporated by reference herein in its entirety.

TECHNICAL FIELD

The present disclosure relates to congestion control on a mobile network and more particularly relates to application aware access control.

DETAILED DESCRIPTION OF PREFERRED EMBODIMENTS

Figure 1:
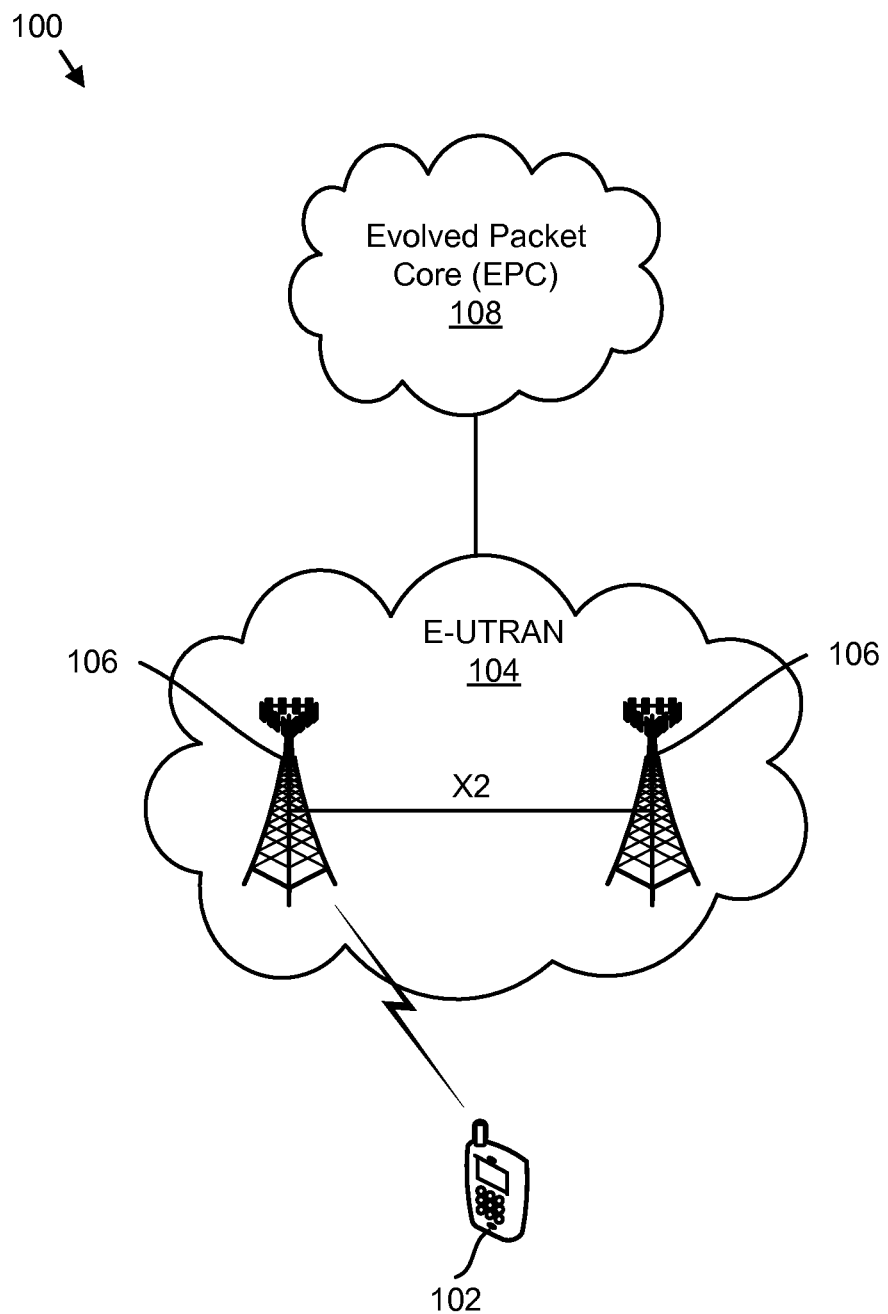
FIG. 1 is a schematic diagram illustrating a communication system for providing communication services to a wireless mobile device consistent with embodiments disclosed herein.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an UTRAN or E-UTRAN, which communicates with the wireless mobile device, known as user equipment (UE). A downlink (or DL) transmission can be a communication from the base station (or eNB) to the wireless mobile device (or UE), and an uplink (or UL) transmission can be a communication from the wireless mobile device to the base station.

Mobile and wireless networks can experience significant variations in traffic load. For example, the number of connected devices present on the network can change in response to events, time of day, or the like. Similarly, emergency situations may cause a spike in communications or damage network infrastructure reducing how much traffic a network can handle. In some situations, heavy loads may be managed using congestion controls which may limit certain devices or types of traffic from using the network to increase the likelihood that important traffic will be communicated. Currently, a number of access control services are used in 3GPP to selectively disable or bar devices or types of traffic from being used over the network. For example, Access Class Barring (ACB) allows the network to forbid UEs from having initial random access channel (RACH) access for specific access services, such as circuit switched fallback (CSFB) services to support legacy devices which use circuit switched services. As another example, Service Specific Access Control (SSAC) allows the network to forbid UEs from doing initial RACH access for internet protocol (IP) multimedia services (IMS) voice or video.

However, currently available access controls are quite limited. For example, current services are not application aware in that it is not possible to differentiate between specific applications, e.g., Facebook video versus IMS video. Furthermore, it is not possible to control the establishment of a new bearer for a new application if the UE is in connected mode. Moreover, SSAC and ACB are currently applied separately and coordination of such functionality within the UE becomes cumbersome. In Release 13 of 3GPP, a study item named Application specific Congestion control for Data Communication (ACDC) is currently ongoing in 3GPP technical specification group (TSG) service and system aspects working group 1 (SA1).

In light of the foregoing, this disclosure provides a framework for 3GPP evolution toward an application aware congestion control model. In one embodiment, the application discloses new functionality in the UE which will be responsible for centralizing the control of access for both idle mode and/or connected mode UEs. According to one embodiment, a UE is configured to receive, from a network, a first access control message and a second access control message. The first access control message corresponds to a first access control service, and the second access control message corresponds to a second access control service. In one embodiment, the first and second access control messages include access control information for controlling access to the network for at least one application on the UE. The UE is also configured to determine a combined access level for the at least one application based on the first and second access control messages and to limit access to wireless communications for the at least one application based on the combined access level.

In order to improve clarity and to avoid obscuring the disclosure, the embodiments and examples provided herein focus on systems, methods, and apparatuses that operate based on a 3GPP LTE standard. Although terminology and examples of operation are generally directed toward LTE, one of skill in the art will recognize modifications to apply various teachings to other communication standards. Terminology such as UE, eNB, or other terms used in the specification should be understood as encompassing other similar systems or components used in other communication protocols.

A detailed description of systems, devices, and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

FIG. 1 illustrates one embodiment of a communication system 100 for providing communication services to a UE 102. The communication system 100 includes an E-UTRAN 104, which includes eNBs 106, and an evolved packet core (EPC) 108. The UE 102 may include any type of communications and/or computing device. Example UEs 102 include phones, smartphones, personal digital assistants (PDAs), tablet computers, notebook computers, ultrabook computers, or the like. The UE 102 may include a plurality of applications installed and running on the UE 102 which may periodically communicate data over the E-UTRAN 104 and/or EPC 108. The UE 102 may include devices configured to communicate using a 3GPP standard such as universal mobile telecommunication system (UMTS), LTE, LTE-Advanced (LTE-A), or the like. In some embodiments, the UE 102 may include a mobile wireless device configured to communicate based on any other wireless communication standard.

The E-UTRAN 104 is configured to provide wireless data access to the UE 102 and a plurality of other wireless mobile devices. The E-UTRAN 104 provides wireless data, voice, and/or other communications available through the EPC 108 to the UE 102, including the plurality of applications installed on the UE 102. In one embodiment, the E-UTRAN 104 operates according to a wireless protocol, such as a wireless protocol that the UE 102 is capable of using. The eNBs 106 may implement transmission point and RNC functions. The eNBs 106 are configured to communicate with each other via an X2 interface, as depicted.

Because specific entities of the E-UTRAN 104 and/or EPC 108 have limits on how much traffic they can handle, failure of an entity, or a fluctuation in traffic flow, may render the E-UTRAN 104 and/or EPC 108 unable to handle all traffic from the UE 102 or other UEs 102. For example, if one of the eNBs 106 is damaged in a natural disaster, the other eNB 106 may not be able to handle all traffic that was previously handled by both eNBs 106. Thus, some requests or needs for communication may go unmet. The unmet needs or requests may include communications which may be of great importance. In one embodiment, the UE 102 is configured to receive access control data from the E-UTRAN 104 and/or EPC 108 and may limit data communications for some applications to reduce the congestion or load on the network. The access control data may disable communication by applications that are of less importance (e.g., games) but allow communication for applications that are may be of greater importance (e.g., voice communications).

Figure 2:
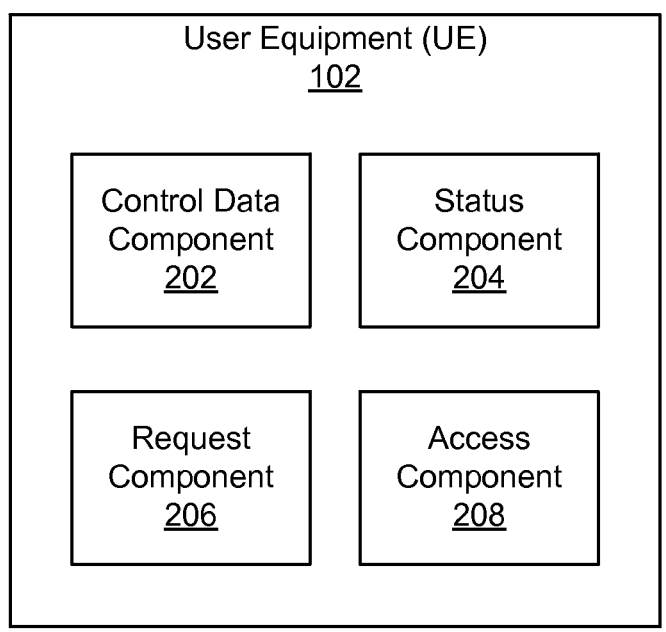
FIG. 2 is a schematic block diagram illustrating one embodiment of a mobile communication device consistent with embodiments disclosed herein.

FIG. 2 is a schematic block diagram of a UE 102 that is configured to limit access to wireless communications at an application level. The UE 102 includes a control data component 202, a status component 204, a request component 206, and an access component 208. The components 202-208 are given by way of example only and may not all be included in all embodiments. Furthermore, additional components may be included in some embodiments.

The control data component 202 retrieves access control which indicates which applications on the UE 102 are allowed to communicate using a mobile network. In one embodiment, the control data component 202 receives one or more access control messages from the mobile network that indicate which applications are allowed to communicate or are barred from communicating. In one embodiment, one of the access control messages may be specific to a currently existing access control service, such as the SSAC or ACB services. In one embodiment, at least one access control message corresponds to a new access control layer.

In one embodiment, the control data component 202 may receive a plurality of access control messages which correspond to two, three, or more different services. For example, the control data component 202 may receive a first access control message and a second access control message. The first access control message may correspond to a first access control service, and the second access control message may correspond to a second, different access control service. In one embodiment, access control messages may be received which correspond to a third or more access control service, such as a new access control layer. The access control messages may indicate whether an application or application category is specifically barred or allowed, or may indicate a probability regarding whether the application is barred or allowed. In one embodiment, the access control component 202 may receive access control messages via a broadcast channel and/or via a dedicated message to the UE 102. In one embodiment, the access control component 202 may receive messages sent via the non-access stratum (NAS) layer, radio resource configuration (RRC) layer or other layer of the 3GPP protocol stack.

In one embodiment, the access control messages received by the access control component 202 may correspond to preconfigured lists of applications or application categories. For example, the lists of applications or application categories may be defined by an operator, defined by a standard (e.g., a 3GPP standard), or the like. In one embodiment, the lists may be communicated to a UE 102 upon activation of the UE 102. In one embodiment, a list of applications may include a list of applications which are installed on the UE 102 or which may communicate using the network. In one embodiment, the access control component 202 may retrieve the preconfigured lists from memory or receive them from the network in dynamic messages. The access control messages may include a matrix or array of values which indicate which of the items in a preconfigured list are allowed, are barred, or have a specific probability for being barred.

Similarly, the preconfigured lists may define categories or classifications for applications. For example, it may be prohibitive to list all applications that the operator would like to specifically allow or bar. However, a list of application categories may be defined to encompass a plurality of applications that fall within those categories. As an example, the operator may define five categories. A first category, category A, may correspond to high-priority applications such as applications for emergency calls, disaster message board, or the like. A second category, category B, may include applications for voice calls including conventional voice or voice over IP (VoIP). A third category, category C, may include streaming applications such as radio or video streaming applications. A fourth category, category D, may include web browsing applications. A fifth category, category E, may include interactive applications such as video games. In one embodiment, additional categories may include all other applications that do not fall within another application. In some embodiments, larger numbers of categories may be used to provide greater granularity in the types of applications that can be barred or allowed to communicate. In one embodiment, each application that is installed on the UE 102 may be required to register as falling within at least one of the application categories.

Access control messages received from a network may reference preconfigured lists, such as those discussed above. Thus, the network may provide access control messages that reference the preconfigured lists, and may thus require less data in to communicate a barred or an allowed status. In one embodiment, barring parameters may be similar to ACB parameters (see 3GPP Technical Specification (TS) 36.331, which is available to the public) for each application or category of applications. For example, if the five categories discussed above are preconfigured (i.e., categories A, B, C, D, and E), the network may configure which applications are allowed by providing a data structure such as {barring parameters cat A, barring parameters cat B, barring parameters cat C, barring parameters cat D, barring parameters cat E} in an access control message. The barring parameters may include an indication of simple allowance or barring, or may include a probability for allowance and/or a time of barring. For example, an application may have a 50% probability of being allowed to communicate over the network and, if barred, may be barred for a specific time period. Another example for communicating a status in an access control message includes a bit map that indicates which category of application is allowed and which one is not. For example, the array/matrix [0 1 0 1 0] may indicate to the UE 102 that the Category A, Category C and Category E are not barred (i.e., allowed) and that Category B and Category D are barred. How many bits are defined will depend on the number of possible categories that need to be defined.

The status component 204 is configured to determine an access status for an application on the UE 102. In one embodiment, the status component 204 may determine an access status based on one or more received access control messages and/or preconfigured lists of applications or application categories. In one embodiment, the status component 204 associates data from access control message with a specific application. For example, the status component 204 may determine the access status by determining an application category to which the application corresponds. Then, using the information in the access control message, the status component 204 can identify a current status for the category and the specific application.

In one embodiment, the status component 204 determines the access status or access level based on messages corresponding to different access control services. For example, the control data component 202 may receive a first message corresponding to an ACB service and a second message corresponding to an SSAC service. Based on this information, the status component 204 may generate a combined access level for a specific application. For example, if an ACB service indicates a first priority and the SSAC service indicates a second priority, the status component 204 may determine a combined priority by selecting a highest priority, lowest priority, average priority, mean priority, or other priority of the first priority and second priority. Similarly, a longest barred access time, shortest barred access time, average barred access time, mean barred access time, or the like may be determined. The status component 204 may associate the combined access level with one or more specific applications. In one embodiment, access control data from access control messages from other services may also be used to generate a combined access level or access status. Additional services which may be combined include an access control layer service which may be based on the present disclosure.

In one embodiment, the status component 204 is responsible for combining all access control information received from the network, such as ACB, SSAC, and any other application specific or subscription specific access controls. By generating a combined access level, the status component 204 may simplify access control, as all access control may be administered by a single entity, layer, or component of the UE 102. For example, rather than referencing different locations or access control data within the UE 102, an application can be denied based on checking the combined access control level. Similarly, if a UE 102 supports a newer version standard that includes an access control layer, the UE 102 may simply ignore access control information from other services (such as the ACB, SSAC) while older UEs 102 will still be able to utilize these services. Furthermore, an application will not need to check with different services. For example, if two different services have a probability for allowing access and the UE 102 is required to check with both services, the access level may be significantly increased. For example, a 50% probability for a first service and a 50% probability for a second service may result in a probability of 75% of denial if the application is separately subject to different services. In some embodiments, however, this higher probability may be desirable. Overall, a combined access level may provide a reduction in complexity in limiting access.

The request component 206 is configured to receive requests from an application to communicate over a wireless network. For example, the request may include a request to schedule communication for operation of the application. The request component 206 may notify an access component 208 of the request and/or store parameters of the application and request for later access. In one embodiment, the status component 204 may determine an access status or access level in response to the request.

The access component 208 is configured to limit an application's access to networks resources based on the access control messages and/or the access level determined by the status component 204. In one embodiment, the access component 208 may limit access by notifying an application of a current access status or access level for the application. The access component 208 may indicate to the application that the application is blocked, is allowed, or has a specific probability of being allowed to communicate. In one embodiment, the access component 208 may notify the application of a time period during which the application is barred from communicating or barred from sending requests to schedule a communication. In one embodiment, the access component 208 may notify the application of a current access status that corresponds to the application. In one embodiment, the access component 208 notifies the application of an access level determined by the status component 204.

In one embodiment, the access component 208 notifies an application of its access level in response to a request received by the request component 206 from the application. For example, the application may send a request for a new connection. If the application access status is that the application is allowed to use the network, the access component may notify the application that it is allowed to proceed. However, if the application is barred, the access component 208 may send a rejection notification to the application. After the rejection, the access component 208 may inform the application of a time period for which the application is barred. The application may then wait until the time period has expired to send additional requests. In one embodiment, the application is allowed to periodically request until the request is accepted. In one embodiment, the application may wait until the access component 208 notifies the application that the access status has changed to allow the application to communicate.

In one embodiment, applications may not send requests but may operate based on an assumption that they are allowed to access until notified otherwise by the access component 208. For example, the access component 208 may provide a notification of an access level for the application without receiving a request from the application. In one embodiment, the access component 208 may determine whether an access level for a specific application has changed. If the access level has changed, the access component 208 may notify the application of the current status. If the access level has not changed, the access component 208 may skip notifying the application and allow the application to assume that no change has occurred. For example, the access component 208 may inform an application when an application or a class/category of applications is restricted from access. When the condition changes, the access component 208 informs the corresponding application(s) of the change of the access status, i.e., from restricted to allowed. In one embodiment, the access component 208 may determine whether an access level or access status has changed in response to the control data component 202 receiving a message and/or the status component 204 determining an access level status. Notifying the application based on changes to the access level may allow for reduced communication overhead from the application to determine whether it has permission to communicate over the network.

Figure 3:
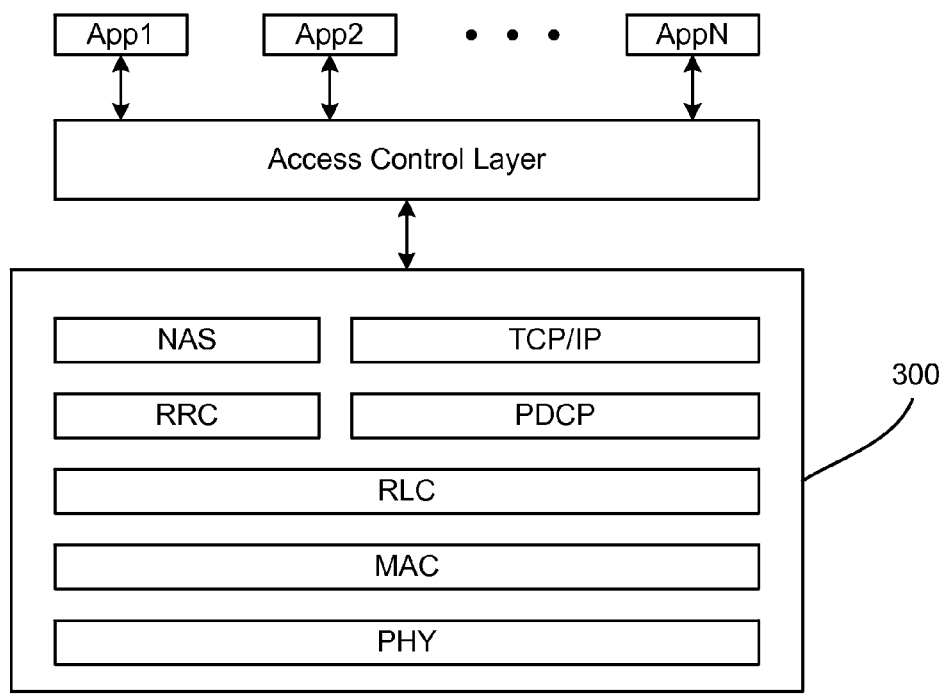
FIG. 3 is a schematic block diagram illustrating logical relationships between a protocol stack and application specific access control consistent with embodiments disclosed herein.
Figure 4:
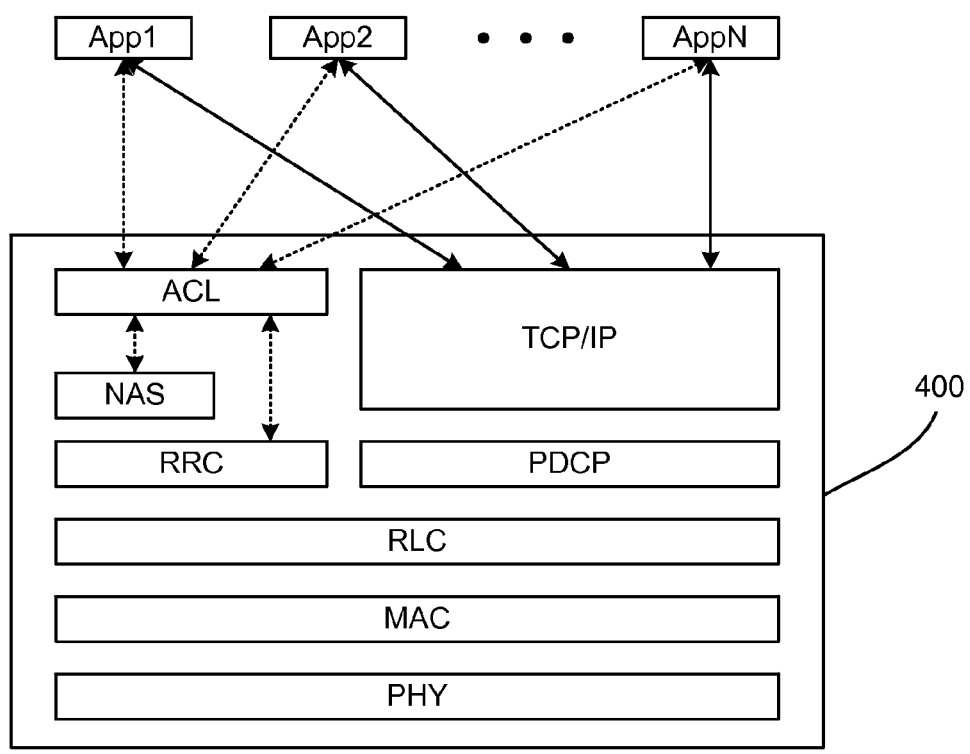
FIG. 4 is another schematic block diagram illustrating logical relationships between a protocol stack and application specific access control consistent with embodiments disclosed herein.

FIGS. 3 and 4 are block diagrams illustrating relationships between access control functionality discussed herein in relation to a 3GPP LTE protocol stack 300 or 400. FIGS. 3 and 4 illustrate an access control layer for controlling access of one or more applications (App1, App2, AppN, etc.) to network communications. For example, the access control layer may encompass or implement the functionality of one or more of the control data component 202, status component 204, request component 206, and access component 208 of FIG. 2. In FIG. 3, the access control layer is shown separate from the protocol stack and sits between the applications and the protocol stack 300. In FIG. 4, the access control layer (ACL) is shown as part of the protocol stack 400, indicating that the features and functionality disclosed herein may be standardized as part of a communication standard. In FIG. 4, the dotted lines indicate control signaling/communication while the solid lines indicate data/payload signaling. For example, access level or other access control information may be communicated to the applications (e.g., based on signaling from the NAS and RRC layers) via the access control layer while application data may be communicated via the transmission control protocol/internet protocol (TCP/IP) layer of the protocol stack. It should be noted that the diagrams of FIGS. 3 and 4 are given by way of example only and do not necessarily restrict the implementation of the UE architecture. Separation in different layers or blocks represents a logical separation of functionality. For example, implementation of the functionality may be dependent on vendor preference.

In one embodiment, the network sends access control information for each application or set/class of applications. This information can be sent in the broadcast channel or via dedicated message to the UE 102, or a combination of both.

The new functionality, which may be implemented in the access control layer, is responsible for handling the application specific information received from the network. Other functions such as ACB, SSAC, and any other existing access control may remain in place as previously implemented and may be applied independently or may be applied by the access control layer. In this way, if the operator chooses, the operator may disable existing functionality such as ACB and SSAC by simply not using that functionality. Alternatively UEs 102 that use this new access control layer might not apply other access control mechanism (e.g., based on an indication in the specification or based on an indication from the network). In that way the UE 102 can be backwards compatible and new networks can rely solely upon the access control layer, if desired.

In embodiments where ACB and SSAC are still used, the access control layer may need to combine that information with the information from ACB and SSAC with any information specific to the access control layer. For example, a given access class (AC) may be barred (and the UE 102 is barred from accessing the cell for that AC) based on the ACB service. If a request is sent from an application to the access control layer, then even if the application is not restricted from access, the access control layer applies the ACB barring. The access control layer may also send any restriction information, including the barring time (time the UE 102 is forbidden to access the network, which may result from calculations during the ACB procedure). In one embodiment, the access control layer may still send the notification to the application layer when the application is restricted from access, which may avoid the necessity for the application to send communication requests every time.

In the embodiment, the access control layer interfaces directly with each of the applications in the UE 102 (App1, App2, AppN, etc.). This interfacing does not necessarily need to be a direct or physical interface. In some implementations there may be middleware between the applications and the protocol stack, in which case the access control layer would interface with the middleware. In some implementations, an operating system (OS) of the UE 102 controls the communication between applications and the protocol stack. In such implementations, the access control layer may interface with the OS. In other words, the interfacing between the access control layer and the applications described herein may be a logical interface which allows the access control layer to control the access that applications have to the 3GPP network.

Figures 5, 6:
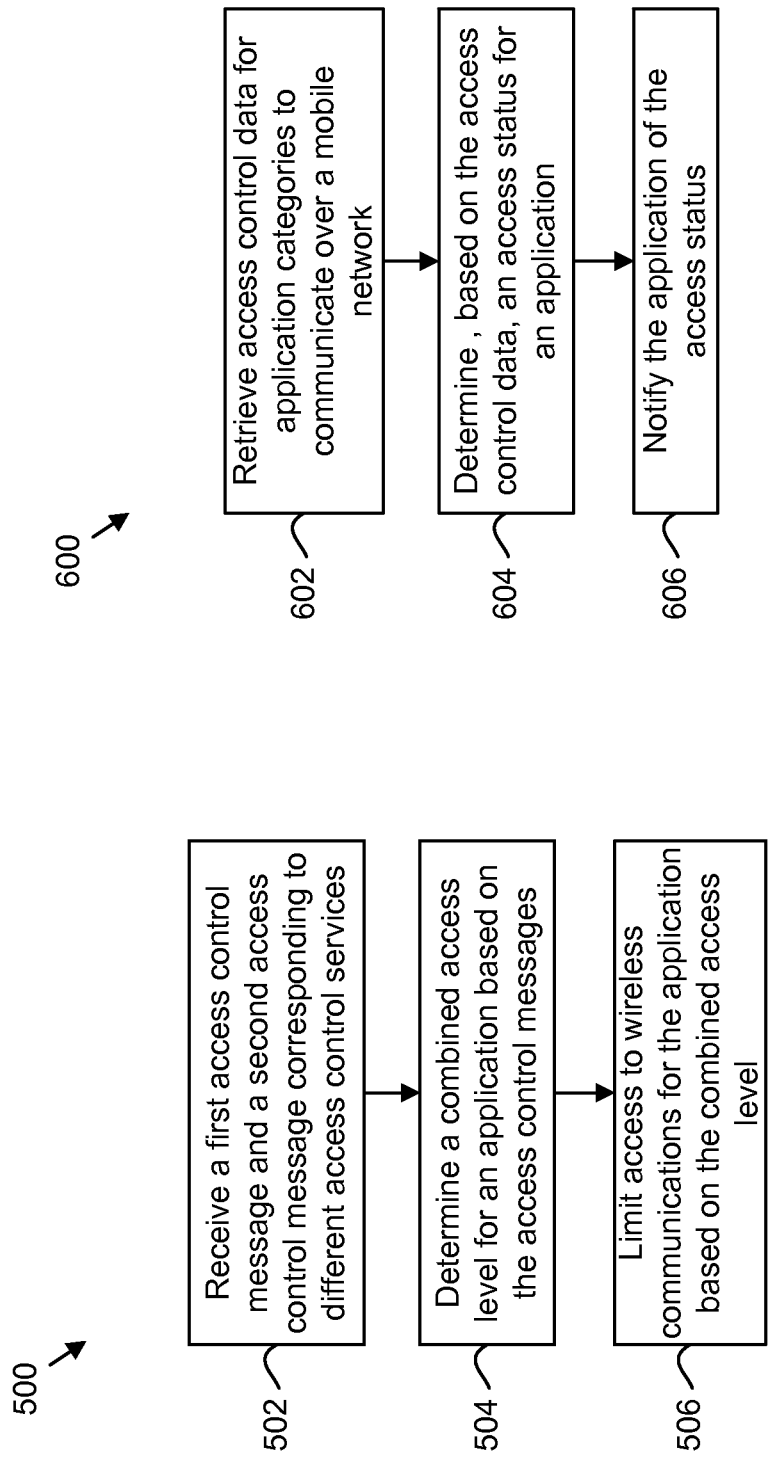
FIGS. 5, 6, and 7 are schematic flow chart diagrams illustrating methods for application aware access control consistent with embodiments disclosed herein.

FIG. 5 is a schematic flow chart diagram illustrating a method 500 for application aware access control. In one embodiment, the method 500 is performed by a mobile device, such as the UE 102 of FIG. 2. In one embodiment, the UE 102 may perform the method 500 after connecting to a mobile communications network, such as the E-UTRAN 104 and/or EPC 108 of FIG. 1.

The method 500 begins and a control data component 202 receives 502 a first access control message and a second access control message. In one embodiment, the first access control message corresponds to a first access control service and the second access control message corresponds to a second access control service different from the first access control service. The access control messages may be sent by an entity of a mobile communications network, such as a server or an entity of the E-UTRAN 104 or EPC 108 of FIG. 1. The first and second access control messages include access control information for controlling access to the network for at least one application on the UE. For example, the access control information may indicate that an application or a category of applications is barred from communicating data over a wireless network.

A status component 204 determines 504 a combined access level for at least one application based on the first and second access control messages. For example, the status component 204 may interpret access control information in both messages to determine a combined access level. In one embodiment, the status component 204 determines the combined access level by identifying one or more applications to which both the first and second access control messages apply. The combined access level may indicate whether an application is barred or allowed from communicating. In one embodiment, the combined access level may indicate a time duration for the barring and/or a probability of being allowed access.

An access component 208 limits 506 access to wireless communications based on the combined access level. For example, the access component 208 may bar an application from accessing wireless communications when the combined access level indicates that the application is barred. Similarly, the access component 208 may determine whether an application is allowed to access the network based on a probability indicated by the combined access level. For example, if the combined access level indicates that the application has a 50% probability of being allowed access, the access component 208 may randomly generate one of two possible values to determine if the application is allowed.

In one embodiment, the access component 208 limits 506 an application's access to wireless communication by providing a notification of an access status to the application. For example, if the combined access level indicates that the application is barred from communicating, the access component 208 may notify the application of the block. The access component 208 may notify the application in response to a request from the application and/or in response to a change of an access status for the application.

FIG. 6 is a schematic flow chart diagram illustrating another method 600 for application aware access control. In one embodiment, the method 600 is performed by a mobile device, such as the UE 102 of FIG. 2. In one embodiment, the UE 102 may perform the method 600 after connecting to a mobile communications network, such as the E-UTRAN 104 and/or EPC 108 of FIG. 1.

The method 600 begins and a control data component 202 retrieves 602 access control data for application categories to communicate over a mobile network. The application categories may include preconfigured categories that each correspond to one or more applications. For example, each category may correspond to applications that perform certain types of data communication on the UE 102. A status component 204 determines 604, based on the access control data, an access status for an application of the mobile communication device. For example, the access component 204 may determine which application corresponds to the access control data and determine an access level for that application.

An access component 208 notifies 606 the application of the access status. For example, the access status may include an access level that indicates whether the application is barred from scheduling a communication over a mobile network. In one embodiment, the access component 208 may notify 606 the application in response to a change in access status and/or in response to a request from the application.

Figure 7:
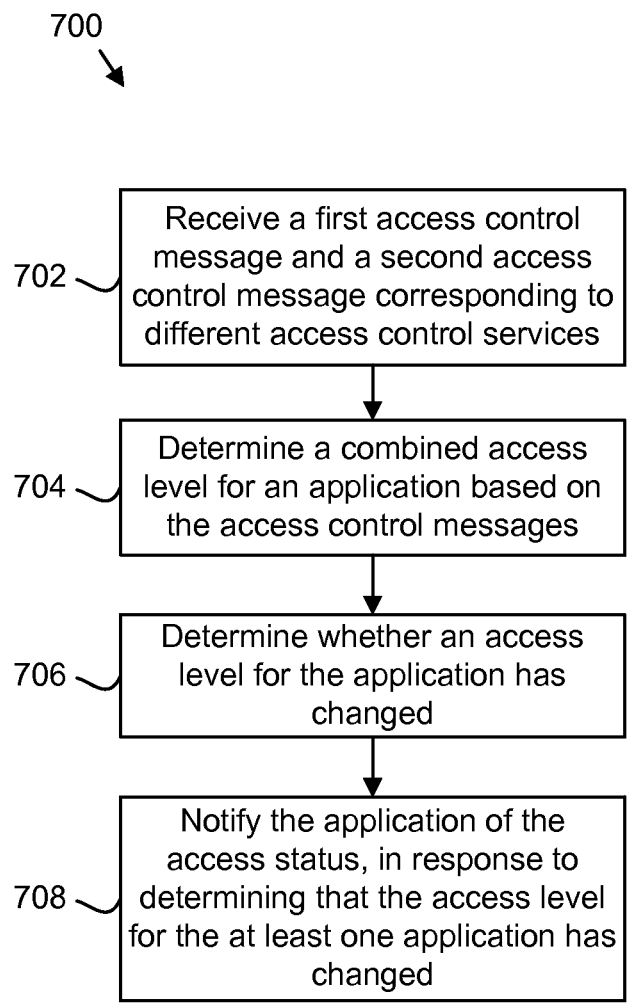

FIG. 7 is a schematic flow chart diagram illustrating yet another method 700 for application aware access control. In one embodiment, the method 700 is performed by a mobile device, such as the UE 102 of FIG. 2. In one embodiment, the UE 102 may perform the method 700 after connecting to a mobile communications network, such as the E-UTRAN 104 and/or EPC 108 of FIG. 1.

The method 700 begins and a control data component 202 receives 702 a first access control message and a second access control message. In one embodiment, the first access control message corresponds to a first access control service and the second access control message corresponds to a second access control service different from the first access control service. The access control messages may be sent by an entity of a mobile communications network, such as a server or an entity of the E-UTRAN 104 or EPC 108 of FIG. 1. The first and second access control messages include access control information for controlling access to the network for at least one application on the UE. For example, the access control information may indicate that an application or a category of applications is barred from communicating data over a wireless network.

A status component 204 determines 704 a combined access level for at least one application based on the first and second access control messages. For example, the status component 204 may interpret access control information in both messages to determine 704 a combined access level. In one embodiment, the status component 204 determines 704 the combined access level by identifying one or more applications to which both the first and second access control messages apply. The combined access level may indicate whether an application is barred or allowed from communicating. In one embodiment, the combined access level may indicate a time duration for the barring and/or a probability of being allowed access.

An access component 208 determines 706 whether an access level for an application has changed. For example, the access component 208 may compare a current access level with a previous access level to determine 706 whether the access level has changed. If the access level has changed, the access component 208 notifies 708 the application of the access level. For example, the access level may indicate whether the application is barred from scheduling a communication over a mobile network. In one embodiment, the access component 208 may notify 708 the application in response to a change in access status and/or in response to a request from the application.

Figure 8:
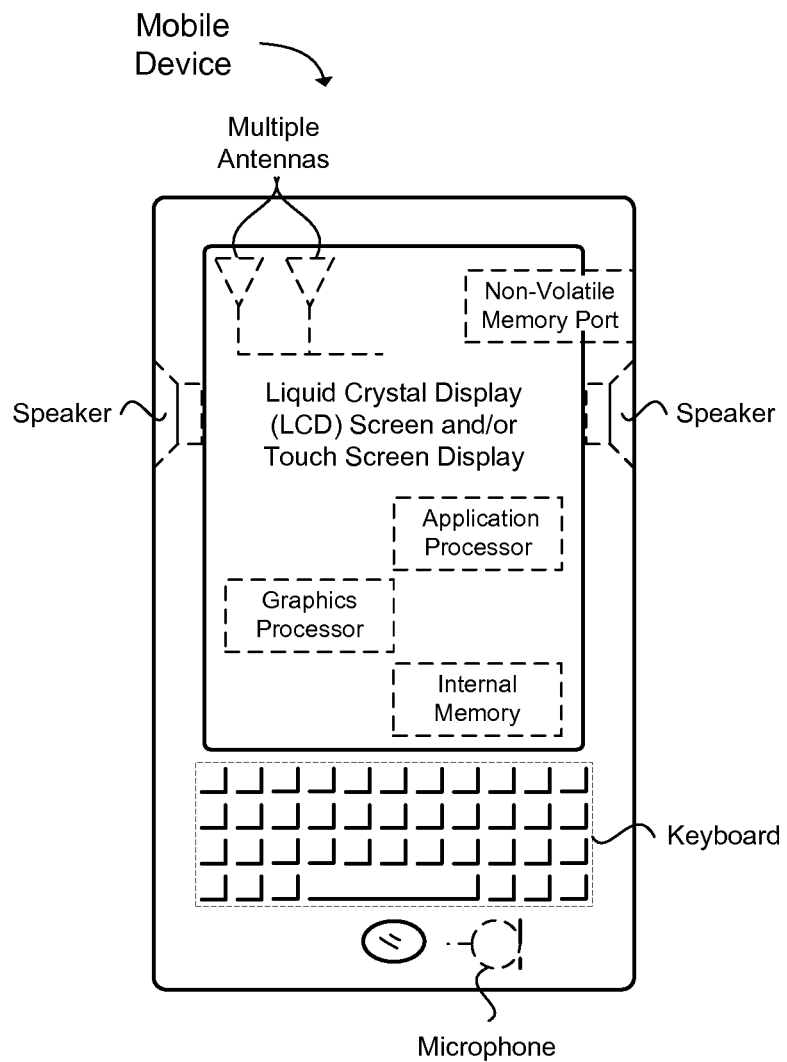
FIG. 8 is a schematic diagram of a mobile device consistent with embodiments disclosed herein.

FIG. 8 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

The following examples pertain to further embodiments.

Example 1 is a UE configured to receive, from a network, a first access control message and a second access control message. The first access control message corresponds to a first access control service and the second access control message corresponds to a second access control service. The first and second access control messages include access control information for controlling access to the network for at least one application on the UE. The UE is configured to determine a combined access level for the at least one application based on the first and second access control messages. The UE is configured to limit access to wireless communications for the at least one application based on the combined access level.

In Example 2, the first access control service of Example 1 optionally includes an SSAC service.

In Example 3, the second access control service of any of Examples 1-2 optionally includes an ACB service.

In Example 4, the first access control message of any of Examples 1-3 indicates a first probability for barring the at least one application and the second access control message indicates a second probability for barring the at least one application. The UE determines the combined access level by determining a combined probability based on the first probability and second probability.

In Example 5, one or more of the first access control message and the second access control message in any of Examples 1-5 indicate which applications of a list of applications are allowed to communicate over the network.

In Example 6, one or more of the first access control message and the second access control message in any of Examples 1-5 indicate which categories in a list of application categories are allowed to communicate over the network.

In Example 7, the list of application categories in Example 6 includes a preconfigured list of categories.

Example 8 is a mobile communication device that includes a control data component, a status component, and an access component. The control data component is configured to retrieve access control data for application categories to communicate over a 3GPP LTE network. The status component is configured to determine, based on the access control data, an access status for an application of the mobile communication device. The access component is configured to notify the application of the access status for the application. The access status indicates whether the application is barred from scheduling a communication over the 3GPP LTE network.

In Example 9, the mobile communication device of Example 9 further includes a request component configured to receive a request from the application to schedule a communication over the 3GPP LTE network. The access component is configured to notify the application in response to the request.

In Example 10, the access component in any of Examples 8-9 is configured to notify the application of a time period during which the application is barred from sending additional requests.

In Example 11, the access component of any of Examples 8-10 is configured to notify the application in response to a change in the access status for the application.

In Example 12, the status component in any of Examples 8-11 determines the access status by determining an application category to which the application corresponds.

In Example 13, retrieving access control data in any of Examples 8-12 includes receiving one or more access control messages from the 3GPP LTE network.

In Example 14, the application categories of any of Examples 8-13 include a preconfigured list of application categories. A message of the one or more access control messages indicates which of the application categories are barred from communicating over the 3GPP LTE network.

Example 15 is a method for application aware access control for communication on a mobile network. The method includes receiving, by UE, a first access control message and a second access control message. The first access control message corresponds to a first access control service and the second access control message corresponds to a second access control service. The first and second access control messages include access control information for controlling access to the mobile network for at least one application on the UE. The method includes determining a combined access level for the at least one application based on the first and second messages. The method includes determining whether an access level for the at least one application has changed. the method includes notifying the application of the access level for the application in response to determining that the access level for the at least one application has changed.

In Example 16, one or more of the first access control message and the second access control message in Example 15 indicate which categories in a list of application categories are allowed to communicate over the network.

In Example 17, the list of application categories in Example 16 includes a preconfigured list of categories.

In Example 18, determining the combined access level in any of Examples 15-17 includes determining an application category to which the application corresponds.

In Example 19, notifying the application of the access level in any of Examples 15-18 includes notifying in response to a change in the access level for the application.

In Example 20, retrieving access control data in any of Examples 15-19 includes receiving one or more access control messages from the mobile network.

Example 21 is a method of application aware access control. The method includes receiving, from a network, a first access control message and a second access control message. The first access control message corresponds to a first access control service and the second access control message corresponds to a second access control service. The first and second access control messages include access control information for controlling access to the network for at least one application on the UE. The method includes determining a combined access level for the at least one application based on the first and second access control messages. The method includes limiting access to wireless communications for the at least one application based on the combined access level.

In Example 22, the first access control service of Example 21 optionally includes an SSAC service.

In Example 23, the second access control service of any of Examples 21-22 optionally includes an ACB service.

In Example 24, the first access control message of any of Examples 21-23 indicates a first probability for barring the at least one application and the second access control message indicates a second probability for barring the at least one application. The method determines the combined access level by determining a combined probability based on the first probability and second probability.

In Example 25, one or more of the first access control message and the second access control message in any of Examples 21-25 indicate which applications of a list of applications are allowed to communicate over the network.

In Example 26, one or more of the first access control message and the second access control message in any of Examples 21-25 indicate which categories in a list of application categories are allowed to communicate over the network.

In Example 27, the list of application categories in Example 26 includes a preconfigured list of categories.

Example 28 is a method for application aware access control. The method includes retrieving access control data for application categories to communicate over a 3GPP LTE network. The method includes determining, based on the access control data, an access status for an application of the mobile communication device. The method includes notifying the application of the access status for the application. The access status indicates whether the application is barred from scheduling a communication over the 3GPP LTE network.

In Example 29, the method of Example 9 further includes receiving a request from the application to schedule a communication over the 3GPP LTE network. Notifying the application includes notifying the application in response to the request.

In Example 30, notifying the application in any of Examples 28-29 includes notifying the application of a time period during which the application is barred from sending additional requests.

In Example 31, notifying the application of any of Examples 28-30 includes notifying the application in response to a change in the access status for the application.

In Example 32, determining the access status component in any of Examples 8-11 includes determining an application category to which the application corresponds.

In Example 33, retrieving access control data in any of Examples 28-32 includes receiving one or more access control messages from the 3GPP LTE network.

In Example 34, the application categories of any of Examples 28-33 include a preconfigured list of application categories. A message of the one or more access control messages indicates which of the application categories are barred from communicating over the 3GPP LTE network.

Example 35 is a method for application aware access control for communication on a mobile network. The method includes receiving, by UE, a first access control message and a second access control message. The first access control message corresponds to a first access control service and the second access control message corresponds to a second access control service. The first and second access control messages include access control information for controlling access to the mobile network for at least one application on the UE. The method includes determining a combined access level for the at least one application based on the first and second messages. The method includes determining whether an access level for the at least one application has changed. the method includes notifying the application of the access level for the application in response to determining that the access level for the at least one application has changed.

In Example 36, one or more of the first access control message and the second access control message in Example 35 indicate which categories in a list of application categories are allowed to communicate over the network.

In Example 37, the list of application categories in Example 36 includes a preconfigured list of categories.

In Example 38, determining the combined access level in any of Examples 35-37 includes determining an application category to which the application corresponds.

In Example 39, notifying the application of the access level in any of Examples 35-38 includes notifying in response to a change in the access level for the application.

In Example 40, retrieving access control data in any of Examples 35-39 includes receiving one or more access control messages from the mobile network.

Example 41 is an apparatus that includes means to perform a method in any of Examples 21-40.

Machine readable storage including machine-readable instructions, when executed, to implement a method or realize an apparatus in any of Examples 21-41.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE) configured to:
   receive, from a network, a first access control message and a second access control message, wherein the first access control message is for a Service Specific Access Control (SSAC) service and the second access control message is for an Access Class Barring (ACB) service;
   determine a combined access level based on the first and second access control messages;
   associate the combined access level with an application, wherein the combined access level corresponds with the ability of the application to access both services associated with the SSAC and services associated with the ACB; and
   notify the application of the combined access level, wherein access to wireless communications for the application is limited according to the combined access level.

2. The UE of claim 1, wherein the first access control message indicates a first probability for barring and the second access control message indicates a second probability for barring and wherein the UE determines the combined access level by determining a combined probability based on the first probability and the second probability.

3. The UE of claim 1, wherein one or more of the first access control message and the second access control message indicate which applications of a list of applications are allowed to communicate over the network.

4. The UE of claim 1, wherein one or more of the first access control message and the second access control message indicate which categories in a list of application categories are allowed to communicate over the network.

5. The UE of claim 4, wherein the list of application categories comprises a preconfigured list of categories.

6. A method for application aware access control for communication on a mobile network, the method comprising:
   receiving, by a user equipment (UE), a first access control message and a second access control message, wherein the first access control message is for a Service Specific Access Control (SSAC) service and the second access control message is for an Access Class Barring (ACB) service;
   determining a combined access level based on the first and second access control messages;
   associating the combined access level with an application, wherein the combined access level corresponds with the ability of the application to access both services associated with the SSAC and services associated with the ACB; and
   notifying the application of the combined access level, wherein access to wireless communications for the application is limited according to the combined access level.

7. The method of claim 6, wherein one or more of the first access control message and the second access control message indicate which categories in a list of application categories are allowed to communicate over the mobile network.

8. The method of claim 7, wherein the list of application categories comprises a preconfigured list of categories.

9. The method of claim 7, wherein determining the combined access level comprises determining an application category to which the application corresponds.

10. The method of claim 6, wherein notifying the application of the combined access level comprises notifying the application of the combined access level in response to a change in the combined access level for the application.

11. The method of claim 6, wherein the first access control message indicates a first probability for barring and the second access control message indicates a second probability for barring and wherein the UE determines the combined access level by determining a combined probability based on the first probability and the second probability.

12. The UE of claim 2, wherein the combined access level is determined by multiplying the first probability by the second probability.

13. The method of claim 11, wherein the combined access level is determined by multiplying the first probability by the second probability.

\* \* \* \* \*